(12) United States Patent
Walton et al.

(10) Patent No.: US 11,422,715 B1
(45) Date of Patent: Aug. 23, 2022

(54) DIRECT READ IN CLUSTERED FILE SYSTEMS

(71) Applicant: EMC IP Holding Company LLC, Hopkinton, MA (US)

(72) Inventors: Jonathan Walton, Seattle, WA (US); Max Laier, Seattle, WA (US); Suraj Raju, Issaquah, WA (US); Cornelis van Rij, Seattle, WA (US)

(73) Assignee: EMC IP Holding Company LLC, Hopkinton, MA (US)

(*) Notice: Subject to any disclaimer, the term of this patent is extended or adjusted under 35 U.S.C. 154(b) by 9 days.

(21) Appl. No.: 17/236,520

(22) Filed: Apr. 21, 2021

(51) Int. Cl.
*G06F 3/06* (2006.01)

(52) U.S. Cl.
CPC .......... *G06F 3/0619* (2013.01); *G06F 3/0605* (2013.01); *G06F 3/0653* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 7,120,631 | B1 * | 10/2006 | Vahalia | G06F 16/1774 |
| 2005/0251500 | A1 * | 11/2005 | Vahalia | G06F 16/1774 |
| 2010/0275209 | A1 * | 10/2010 | Detlefs | G06F 9/526 |
| | | | | 710/200 |
| 2017/0123674 | A1 * | 5/2017 | Mori | G06F 3/0649 |
| 2020/0125654 | A1 * | 4/2020 | Ramos | G06F 16/27 |
| 2020/0372046 | A1 * | 11/2020 | Vijayan | G06F 16/275 |

OTHER PUBLICATIONS

International Search Report and Written Opinion received for PCT Application Serial No. PCT/US2021/032746 dated Jan. 21, 2022, 13 pages.

\* cited by examiner

*Primary Examiner* — William E. Baughman
(74) *Attorney, Agent, or Firm* — Amin, Turocy & Watson, LLP

(57) ABSTRACT

Direct read in clustered file systems is described herein. A method as described herein can include determining, for a write operation on a resource stored by a data storage system, as initiated by an initiator node, a reference count for the resource, the reference count comprising a number of target storage regions of the data storage system to be modified by write data during the write operation; facilitating conveying, from the initiator node to a lock coordinator node, the reference count for the resource; facilitating conveying, from the initiator node to respective participant nodes that are respectively assigned to the target storage regions, the write data and a key value for the write operation; and facilitating causing the respective participant nodes to convey respective notifications that comprise the key value in response to the respective participant nodes writing the write data to the target storage regions.

20 Claims, 11 Drawing Sheets

DIRECT READ IN CLUSTERED FILE SYSTEMS

BACKGROUND

Devices in a distributed computing system can utilize protocols, such as NVMe (Non-Volatile Memory Express) over Fabric, or NVMeoF, to enable multiple hosts to directly access the same storage device(s) in the system. While protocols, such as NVMeoF, can result in significant performance benefits, they can also introduce computational and/or network overhead in some cases. For instance, in the context of a distributed, clustered file system, the use of NVMeoF and/or other similar protocols can incur additional overhead due to the need for coordination between hosts in order to avoid accessing stale data.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a data storage system is described herein. The data storage system can include a memory that stores executable components and a processor that executes the executable components stored in the memory. The executable components can include a reference count adjustment component that determines, for a write operation on a resource stored by the data storage system, as initiated by an initiator node of the data storage system, a reference count value for the resource that includes a number of affected storage regions associated with the data storage system to be altered with write data associated with the write operation. The executable components can also include a lock coordinator interface component that facilitates sending, from the initiator node of the data storage system to a lock coordinator node of the data storage system, the reference count value for the resource. The executable components can further include a participant interface component that facilitates sending, from the initiator node of the data storage system to respective participant nodes of the data storage system that are respectively assigned to the affected storage regions, the write data associated with the write operation and a lock key corresponding to the write operation. The lock key can cause the respective participant nodes to provide, to the lock coordinator node, respective notifications that include the lock key in response to the respective participant nodes flushing the write data associated with the write operation to the affected storage regions.

In another implementation, a method is described herein. The method can include determining, by a system operatively coupled to a processor, for a write operation on a resource stored by the system, as initiated by an initiator node of the system, a count value for the resource, the count value representative of a number of target storage regions of the system to be modified by write data associated with the write operation. The method can further include facilitating, by the system, conveying, from the initiator node to a lock coordinator node of the system, the count value for the resource. The method can also include facilitating, by the system, conveying, from the initiator node to respective participant nodes of the system that are respectively assigned to the target storage regions, the write data associated with the write operation and a key value for the write operation. The method can additionally include facilitating, by the system, causing the respective participant nodes to convey respective notifications that comprise the key value in response to the respective participant nodes writing the write data to the target storage regions.

In an additional implementation, a non-transitory machine-readable medium including computer executable instructions is described herein. The instructions, when executed by a processor of a data storage system, can facilitate performance of operations including obtaining, for a write operation on a resource stored by the data storage system, as initiated by an initiator node of the data storage system, a count value representative of a number of affected storage units of the data storage system to be modified by write data via the write operation; transferring the count value from the initiator node to a lock coordinator node of the data storage system; transferring, from the initiator node to respective participant nodes of the data storage system that respectively manage the affected storage units, the write data and a key value associated with the write operation; and causing the respective participant nodes to send respective notifications comprising the key value to the lock coordinator node in response to the respective participant nodes recording the write data to the affected storage units.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
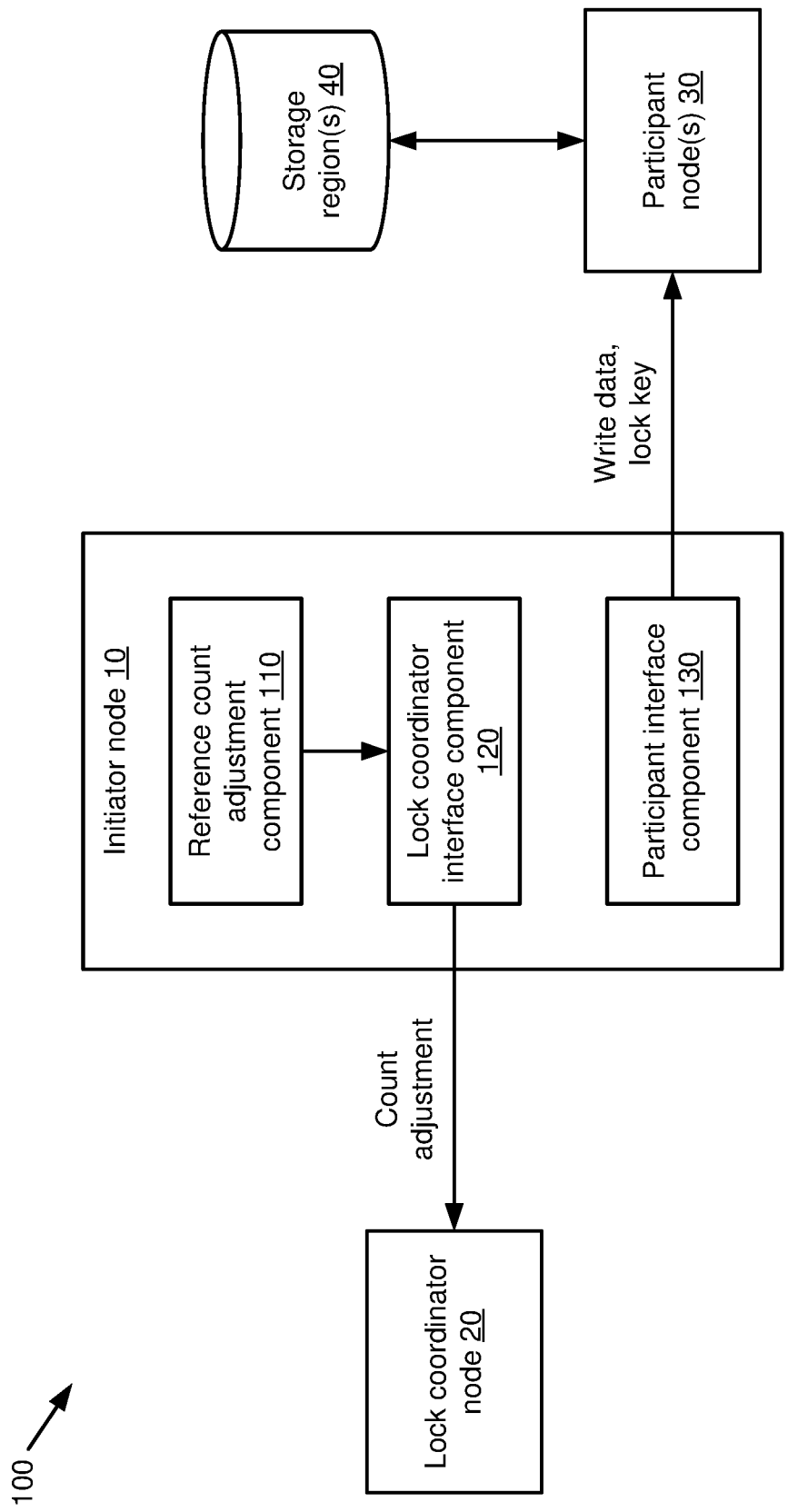
FIG. 1 is a block diagram of a system that facilitates direct read in clustered file systems in accordance with various implementations described herein.

With reference now to the drawings, FIG. 1 illustrates a block diagram of a system 100 that facilitates direct read in clustered file systems in accordance with various implementations described herein. As shown in FIG. 1, system 100 includes a reference count adjustment component 110, a lock coordinator interface component 120, and a participant interface component 130, which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an implementation, the components 110, 120, 130 can be associated with a computing node and/or other computing device associated with a file storage system and/or other data storage system. For instance, the components 110, 120, 130 as shown in system 100 are each associated with an initiator node 10 of system 100, which is defined as a computing node of system 100 that is attempting to read and/or write to a file or other resource stored by system 100. It is noted that in some implementations herein, a distinction is made between a read initiator that initiates a read operation and a write initiator that initiates a write operation. For instance, the initiator node 10 shown in system 100 can operate as a write initiator node associated with a write operation to a file or other resource. However, it is further noted that the distinction between a read initiator and a write initiator as used herein is merely for purposes of description and that the general term "initiator node" as used herein can refer to either a read initiator or a write initiator, depending on context.

Also or alternatively, the components 110, 120, 130, and/or other components as will be described in further detail below, can be implemented within other computing nodes or devices, such as a lock coordinator node 20, a participant node 30, and/or other suitable system nodes. The lock coordinator node 20 shown in system 100 can maintain states for respective locks, which control read and/or write access to respective resources stored by system 100. In an implementation, the initiator node 10 can be configured to request a lock for a given resource from the lock coordinator node 20 before it is permitted to perform an operation on the resource. The lock coordinator node 20, in turn, can grant lock access to the initiator node 10 when there are no other contending lockers for the requested resource.

As further shown in system 100, the participant node(s) 30 are assigned to respective storage regions 40 associated with system 100 and are responsible for modifications to the data stored on the respective storage regions 40. As used herein, the term "storage region," also referred to herein as a "storage unit," is a definable subset of the available storage of a data storage system. By way of example, a storage region or unit can correspond to storage disks, e.g., from among a group of storage disks; one or more bytes; data blocks; address ranges, partitions, and/or other subset of a storage disk, e.g., that make up less than all of a storage disk; and/or any other pre-existing or purpose-built division for partitioning and tracking allocation of storage.

In an implementation, a participant node 30 can buffer modifications in an intermediary non-volatile store before flushing the modifications to a storage region 40. Modifications to the storage regions 40 are performed transactionally, e.g., using an extended two-phase commit (2PC) protocol such as the 2PC version 2 (2PCv2) protocol, and are facilitated via communications between the initiator node 10, the lock coordinator node 20, and the participant node(s) 30. An example transaction that can be utilized to facilitate a modification to a storage region 40 is described in further detail below with respect to FIG. 9. As will be further described below, the respective participant nodes 30 can utilize local non-volatile storage to prepare file system updates during a transaction.

While the initiator node 10, lock coordinator node 20, and participant node(s) 30 shown in system 100 are logically distinct and are illustrated as distinct entities, it is noted that the initiator node 10, lock coordinator node 20, and participant node(s) 30 need not be physically distinct. For instance, the initiator node 10, lock coordinator node 20, and/or participant node(s) 30 could be housed by a common physical chassis and/or other apparatus despite being logically separate system nodes. Alternatively, respective ones of the nodes 10, 20, 30 could be located in different physical devices. Regardless of physical implementation, the respective nodes 10, 20, 30 can be configured for communication over a backend network, e.g., via any suitable wired or wireless communication protocol, to exchange messages associated with file system transactions.

As described above, an initiator node 10 can obtain a lock from a lock coordinator node 20 that enables the initiator node 10 to begin a read or write operation on a resource (a block, file, etc.) stored on the storage regions 40. The lock can, in turn, protect the integrity of the target resource by preventing access collisions caused by multiple system nodes attempting to access the same resource simultaneously. Thus, for example, an initiator node 10 can guarantee upon obtaining a lock for a resource that the contents and/or location of the resource will not be altered by other system nodes while it is accessing the resource.

In the event of a read operation, an initiator node 10 obtains a lock for a given resource and subsequently submits a read request to the participant node(s) 30 that are responsible for the storage region(s) 40 on which the requested resource is stored. In response to the read request, a participant node 30 can return either the requested data as stored on the corresponding storage region 40 or, if the participant node 30 knows the requested data as stored on the storage region 40 to be outdated, a locally staged version of the resource. Various implementations as described herein can be utilized to enable the initiator node 10 to bypass the responsible participant node(s) 30 and access requested data stored on the storage storage region(s) 40 directly in some cases, thereby reducing the amount of messaging overhead associated with a read operation. Examples of both direct and indirect read operations that can be performed are described herein with respect to FIGS. 5-7.

By implementing techniques to facilitate direct read in a clustered file system as described herein, various advantages that can improve the functionality of a computing system can be realized. These advantages can include, but are not limited to, the following. Computing resources (e.g., processor cycles, memory usage, power consumption, etc.) associated with computations performed by a participant node for a read transaction can be reduced. Time, network bandwidth, and/or other overhead associated with communications between an initiator node and a participant node for a read transaction can be reduced. Other advantages are also possible.

With reference now to the components 110, 120, 130 of system 100 as shown in FIG. 1, the reference count adjustment component 110 of system 100 can determine, for a write operation initiated by the initiator node 10 on a file or other resource stored by the storage regions 40, a reference count value for the resource. In an implementation, the reference count value for a resource can include a number of affected storage regions associated with the write operation, e.g., an amount of the storage regions 40 that will be altered with write data associated with the write operation. Techniques that can be utilized for determining and maintaining a reference count value for a resource are described in further detail below with respect to FIGS. 3-4.

The lock coordinator interface component 120 of system 100 can facilitate sending, from the initiator node 10 to the lock coordinator node 20, the reference count value for the resource as determined by the reference count component 110, e.g., to facilitate an adjustment to the reference count for the resource as maintained by the lock coordinator node 20, as will be described in further detail below with respect to FIG. 4. In an implementation, the lock coordinator node 20 can provide the initiator node 10 with a lock associated with the resource, e.g., prior to or in response to receiving the reference count value for the resource from the initiator node 10.

The participant interface component 130 of system 100 can facilitate sending, from the initiator node 10 to respective participant nodes 30 that "own" or are otherwise assigned to the affected storage regions of the storage regions 40, write data associated with the write operation. The participant interface component 130 can further facilitate sending a lock key or other key value to the participant nodes 30, which can subsequently be used by the participant nodes 30 to provide notifications to the lock coordinator node 20 that include the lock key in response to the participant nodes 30 flushing the write data for the write operation to the storage regions 40. These notifications are described in further detail below with respect to FIG. 4.

Figure 2:
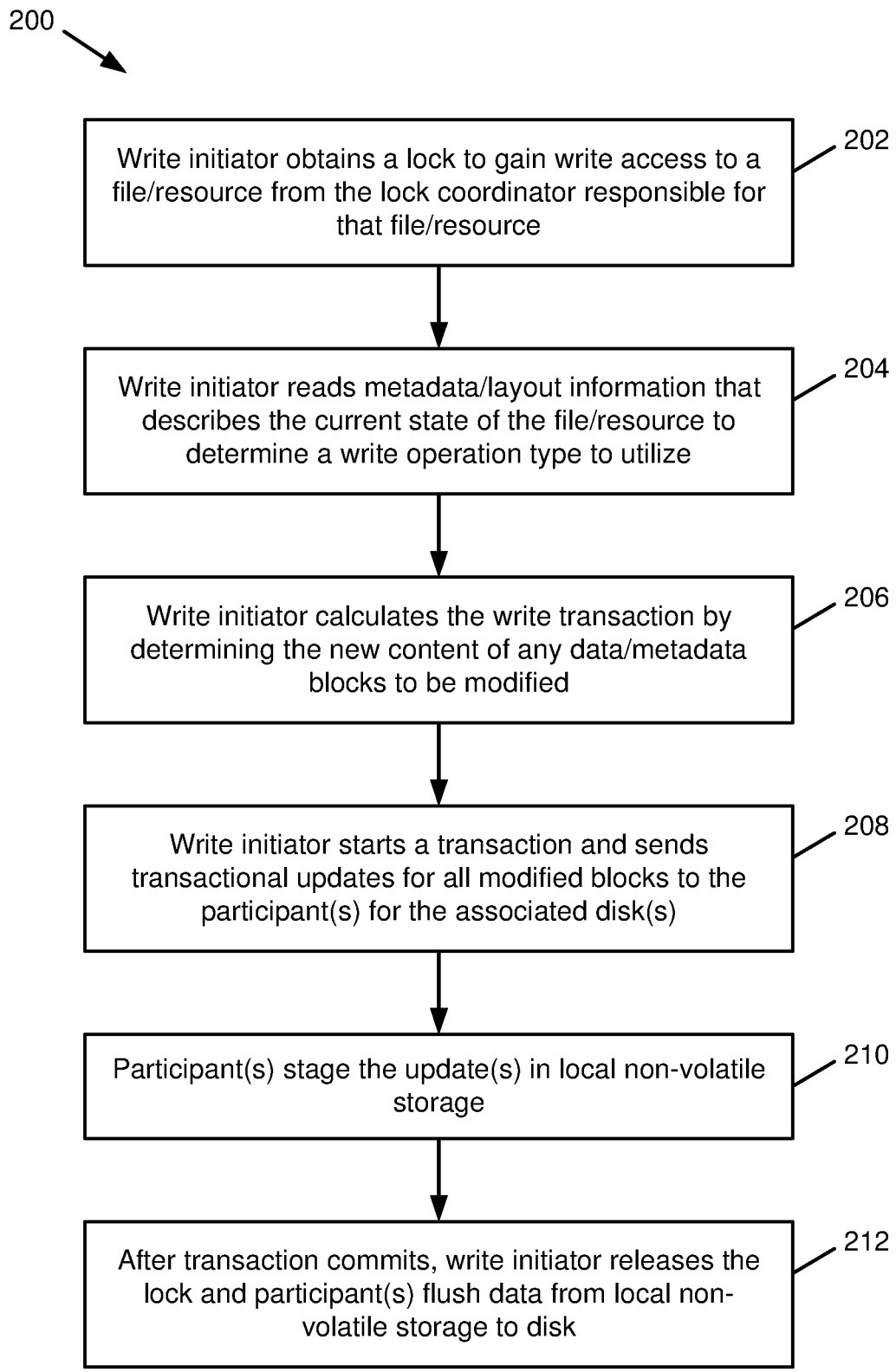
FIGS. 2-3 are flow diagrams of respective methods for conducting a write operation in a clustered file system in accordance with various implementations described herein.

With reference next to FIG. 2, a flow diagram of a method 200 for conducting a write operation in a clustered file system in accordance with various implementations described herein is illustrated. Method 200 can be performed by a system that is similar to system 100, e.g., a system that includes an initiator (here a write initiator), a lock coordinator, and one or more participants that manage respectively corresponding disks. It is noted that while the below description relates to operations performed with respect to disks, other types of storage regions could be utilized in addition to, or in place of, disks without departing from the scope of the description.

At 202, the write initiator can obtain a lock to gain write access to a target file or other resource from the lock coordinator that is responsible for that file or resource. As described above, obtaining a lock for a target resource can enable the write initiator exclusive access to the target resource and/or otherwise hold the physical block addresses at which the target resource is stored in a fixed state to ensure that the write operation can proceed uncontested.

At 204, the write initiator can read metadata and/or other layout information that describes the current state of the target file or resource in order to determine a type of write operation to utilize for the target file or resource. For instance, based on information obtained at 204, the write initiator can prepare an overwrite, an append, and/or other suitable types of write operation.

At 206, the write initiator can calculate the write transaction by determining the new content of any metadata and/or data blocks that are to be modified in the write operation. In an implementation, the calculations performed at 206 can result in write data for the target file or resource, e.g., as described above with respect to FIG. 1.

At 208, the write initiator can start a transaction for the write operation and send the write data for the target file or resource to the participant(s) that are responsible for the disk(s) containing the target file or resource. In an implementation, the write data can be provided by the write initiator in the form of transactional updates for all blocks to be modified in the write transaction.

At 210, in response to the participant(s) receiving the transactional updates with the write data from the write initiator at 208, the participant(s) can stage the update(s) received at 208 in local storage, e.g., a non-volatile store or the like, at the respective participants. As a result of the write data being locally staged by the participant(s), the on-disk state of the target blocks of the write operation can differ from the intended block state specified by the write operation during a period beginning at 210 and ending at the time the write data associated with the write operation is flushed to disk by the participant(s).

Once the update(s) to the target file or resource are staged by the participants at 210, the write transaction can be committed at the initiator and the participants, e.g., according to a 2PC protocol and/or other suitable transaction protocols. Subsequently, at 212, the write initiator can release the lock on the target file or resource, and the participant(s) can flush the data staged at 210 from local non-volatile storage to disk, thereby causing the on-disk state of the target blocks of the write operation to again match their intended state.

Figure 3:
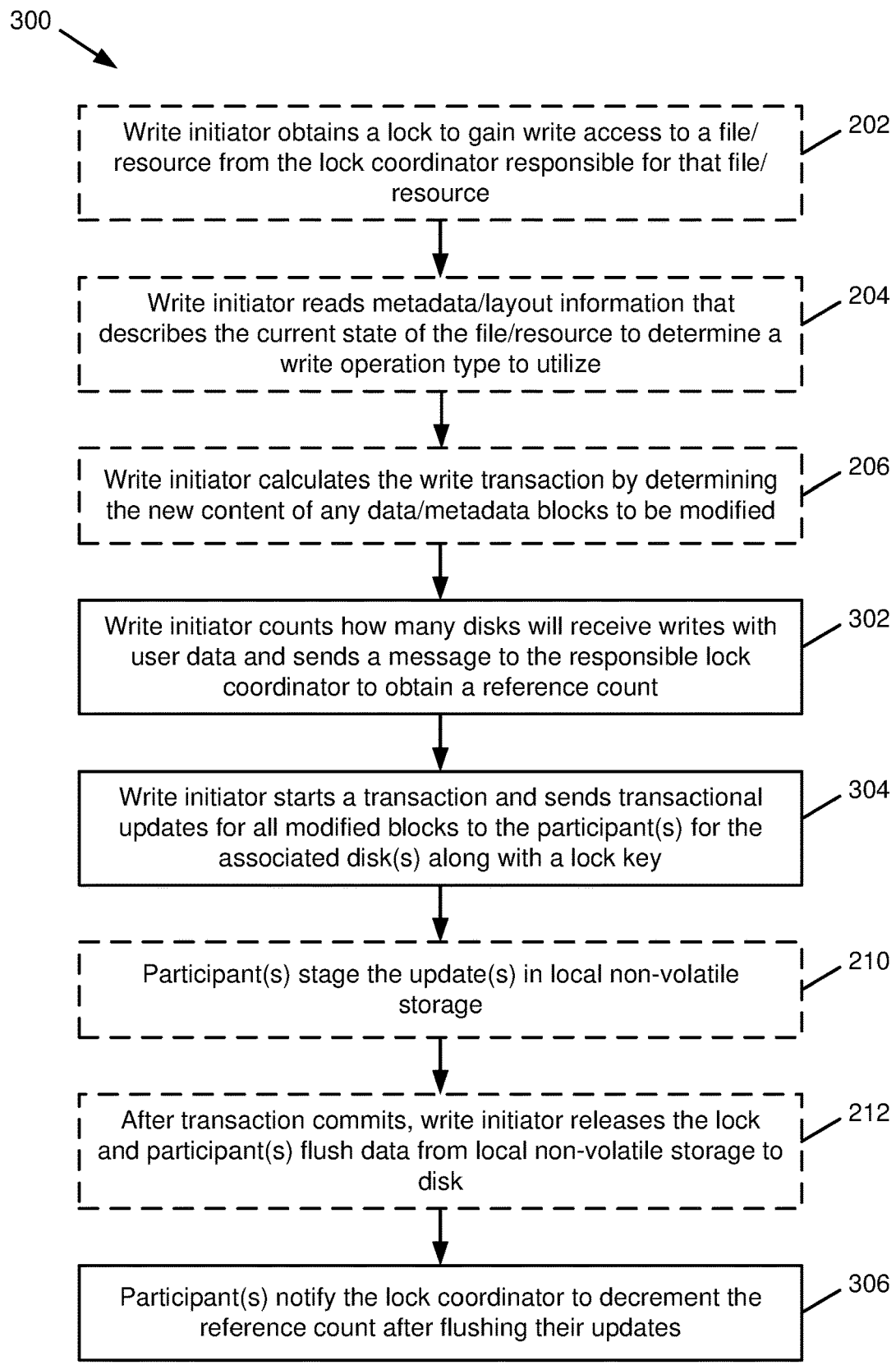

Turning now to FIG. 3, and with further reference to FIGS. 1-2, a flow diagram of an alternative method 300 for conducting a write operation in a clustered file system is illustrated. As shown in FIG. 3, method 300 can be implemented as an extension to method 200 that enables the lock coordinator to determine whether the on-disk state of a given block is the most recent state of the block without conducting additional messaging with the participant(s) to confirm the block state. For the sake of brevity, actions that are common between methods 200 and 300 are indicated in FIG. 3 via dashed lines, and repetitive descriptions of these actions are omitted.

As shown in FIG. 3, subsequent to 206, method 300 proceeds to 302, in which the write initiator can count (e.g., by a reference count adjustment component 110 of the initiator node 10 as shown in system 100) how many different disks will receive writes with user data in connection with the write operation. The write initiator can then send (e.g., by a lock coordinator interface component 120) a message to the lock coordinator that is responsible for the target file or resource (e.g., the lock coordinator node 20 shown in system 100) to obtain a reference count on the section of the file or resource to be updated.

At 304, the write initiator can start a transaction and send (e.g., by a participant interface component 130) transactional updates for all modified blocks to the participant(s) that are responsible for the disk(s) in question, e.g., in a similar manner to that described above with respect to 208 in method 200. In addition to the transactional updates, the write initiator can include a lock key in the write messages sent to the participant(s) at 208, e.g., such that the participant(s) can decrement the reference count at the lock coordinator once all of the transactional updates have been flushed to disk.

Upon completion of the actions performed at 304, the transaction can be committed and the corresponding write data can be flushed to disk, e.g., as described above with respect to 210 and 212 in method 200. As further shown in FIG. 3, after the write data has been flushed to disk by the participant(s) at 212, method 300 can conclude at 306, in which the participant(s) can notify the lock coordinator to decrement the reference count associated with the target file or resource.

Figure 4:
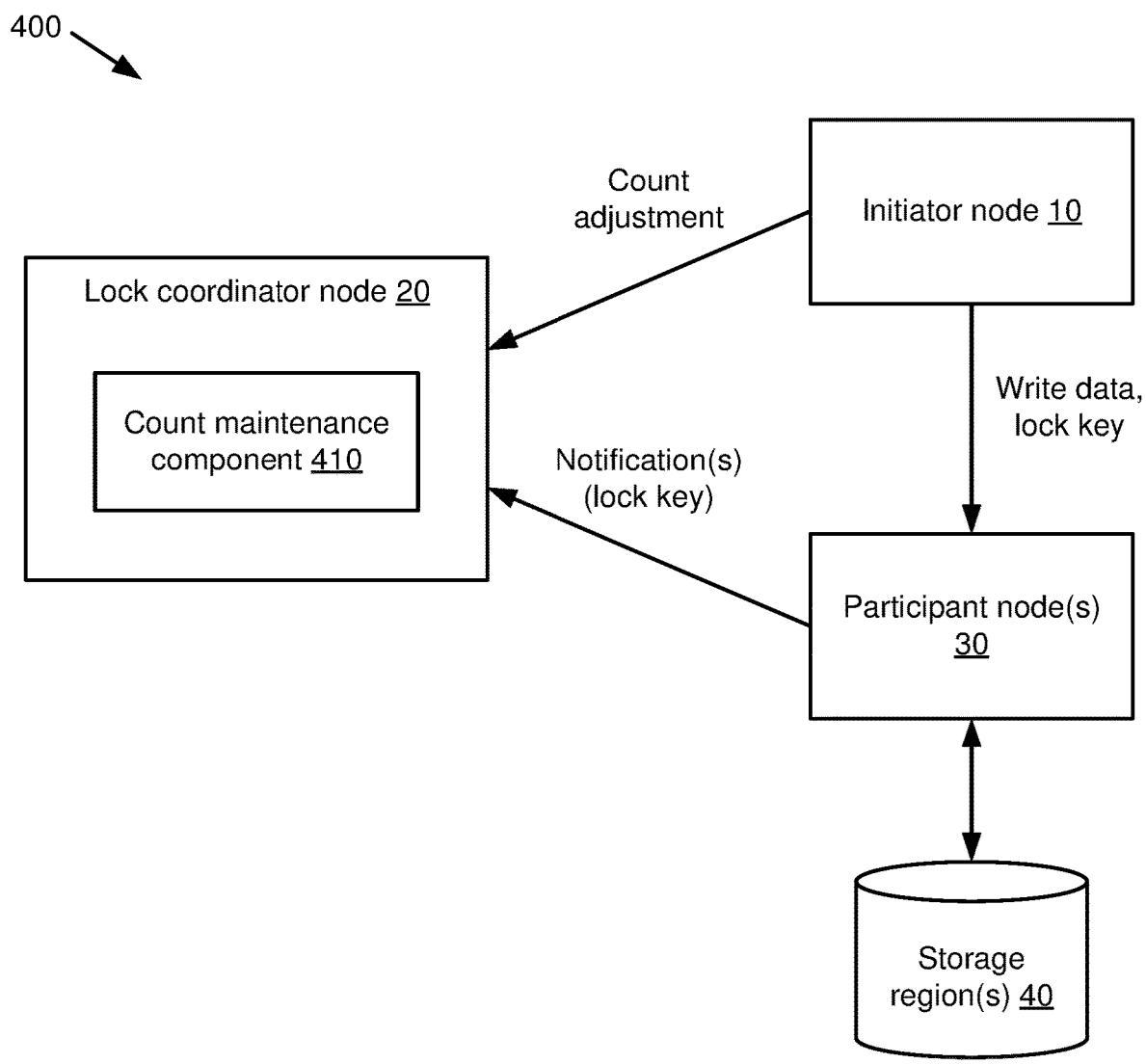
FIG. 4 is a block diagram of a system that facilitates maintaining a reference count for a stored resource in accordance with various implementations described herein.

Referring next to FIG. 4, a block diagram of a system that facilitates maintaining a reference count for a stored resource in accordance with various implementations described herein is illustrated. Repetitive description of like elements employed in other embodiments described herein is omitted for brevity. As shown in FIG. 4, system 400 can include an initiator node 10, a lock coordinator node 20, and one or more participant nodes 30, each of which can operate as generally described above with respect to FIG. 1. As further shown in FIG. 4, the lock coordinator node 20 of system 400 can be associated with a count maintenance component 410 that maintains a reference count or other suitable count value for a file or resource stored by system 400, e.g., via storage regions 40. While the count maintenance component 410 is illustrated in FIG. 4 as being associated with the lock coordinator node 20, it is noted that the count maintenance component 410 could be associated with any suitable node in system 400 and/or implemented as a standalone component in system 400.

In an implementation, the count maintenance component 410 can assign respective reference counts to respective files or other resources stored by system 400, e.g., via the storage regions 40. A reference count for a file or other resource as maintained by the count maintenance component 410 can have a default value, e.g., 0, which can be adjusted in response to messages received by the lock coordinator node 20 from one or more other nodes in system 400. For instance, the count maintenance component 410 can increment a reference count assigned or otherwise associated with a given resource in response to the initiator node 10 sending a message to the lock coordinator node 20 containing a count adjustment value, e.g., as determined based on the number of disks (or other storage regions) to receive write data during a requested write operation as described above at 302 in method 300. Alternatively, the count maintenance component 410 can maintain and/or adjust reference counts for respective resources stored by system 400 based on other suitable messaging or system events.

As additionally shown in FIG. 4, participant nodes 30 to a write transaction can provide respective notifications to the lock coordinator node 20 that include a lock key or other key value provided to the participant nodes 30 by the initiator node 10 for the transaction, e.g., as described above at 306 of method 300. In response, the count maintenance component 410 can decrement the reference count assigned to the target resource of the write transaction by the lock coordinator node 20.

In an implementation, reference counts as described above can be utilized in combination with existing lock mechanisms to serialize access to a file or other logical resource. The use of reference counts as described herein does not incur additional messaging overhead during a read operation and adds minimal additional messaging during a write operation, which can be performed in parallel with other operations and thus not impact overall operation performance.

A reference count for a resource, e.g., as maintained by the count maintenance component 410, can enable the lock coordinator node 20 to determine whether there are pending updates to that resource. For instance, when the reference count for a given resource reaches zero, the lock coordinator node 20 can determine that there are no outstanding updates in any non-volatile store, e.g., non-volatile stores associated with respective participant nodes 30, for the resource. While this is true, the lock coordinator node 20 can provide a special "read direct" lock in response to any read request when an initiator node 10 requests a read lock. When the initiator node 10 receives a read direct lock, the initiator node 10 can perform direct reads, e.g., via NVMeoF, without having to go through the participant node(s) 30.

Figure 5:
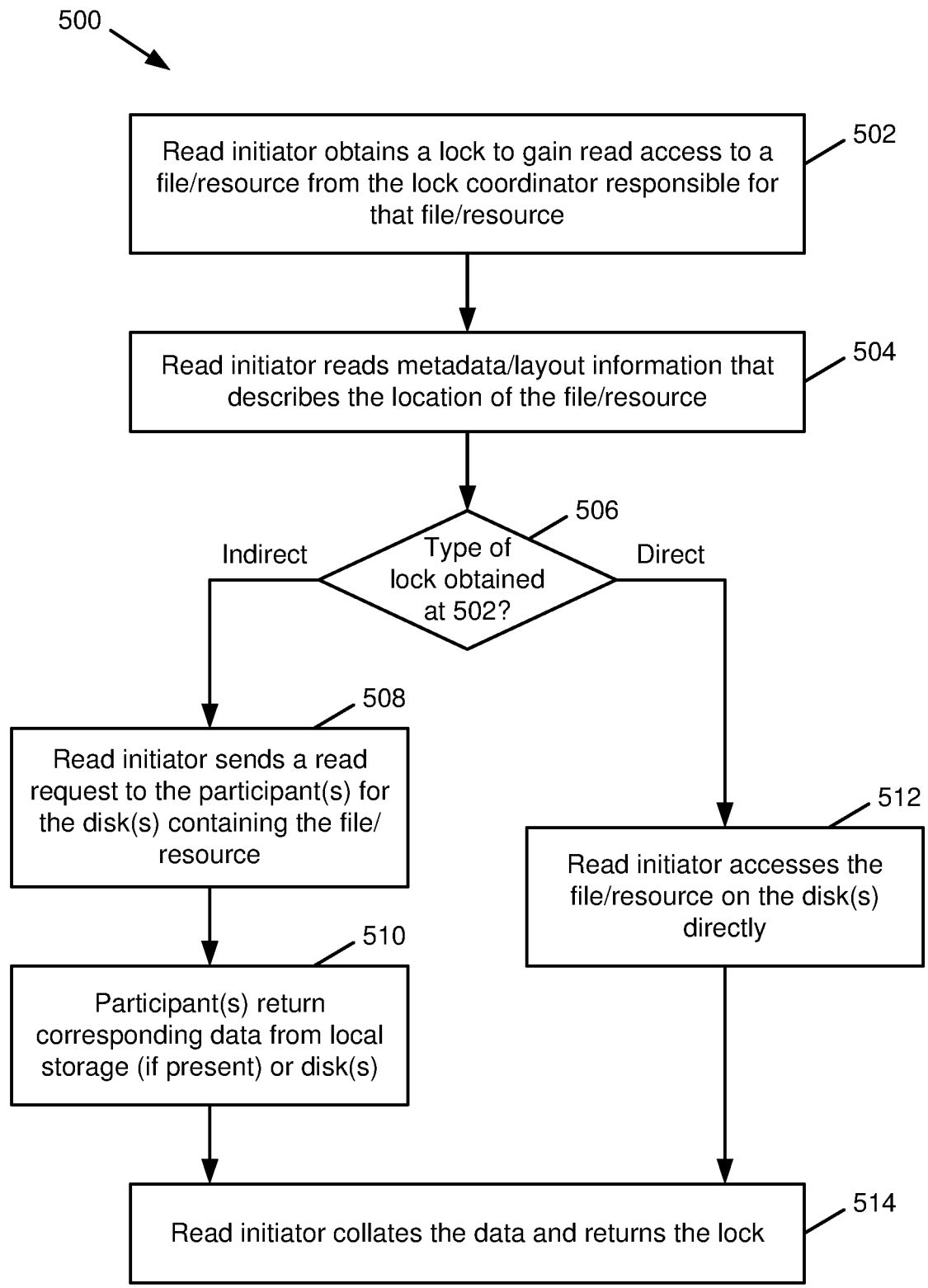
FIG. 5 is a flow diagram of a method for conducting a read operation in a clustered file system in accordance with various implementations described herein.
Figure 6:
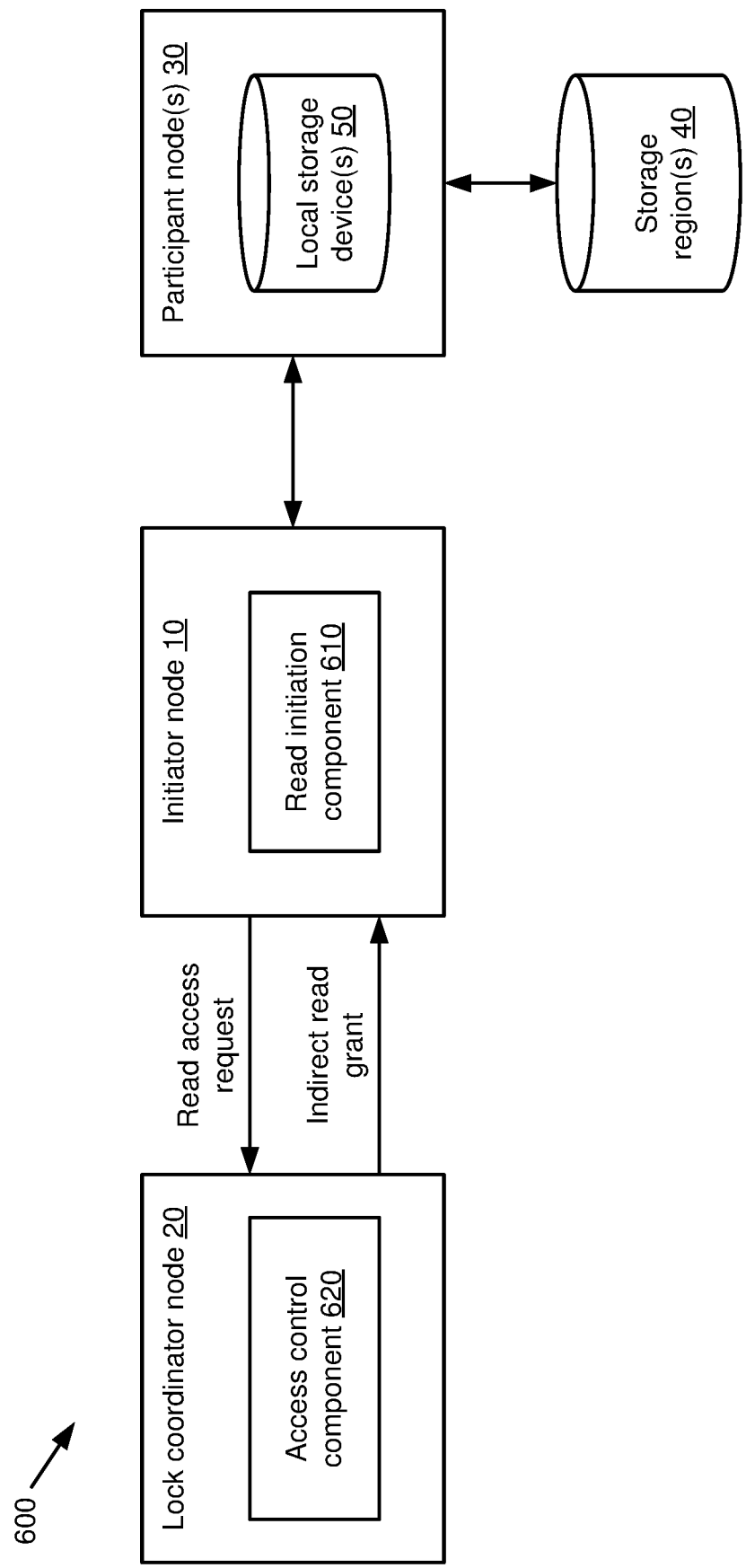
FIGS. 6-7 are block diagrams of respective systems that facilitate performance of the read operation of FIG. 5 in accordance with various implementations described herein.
Figure 7:
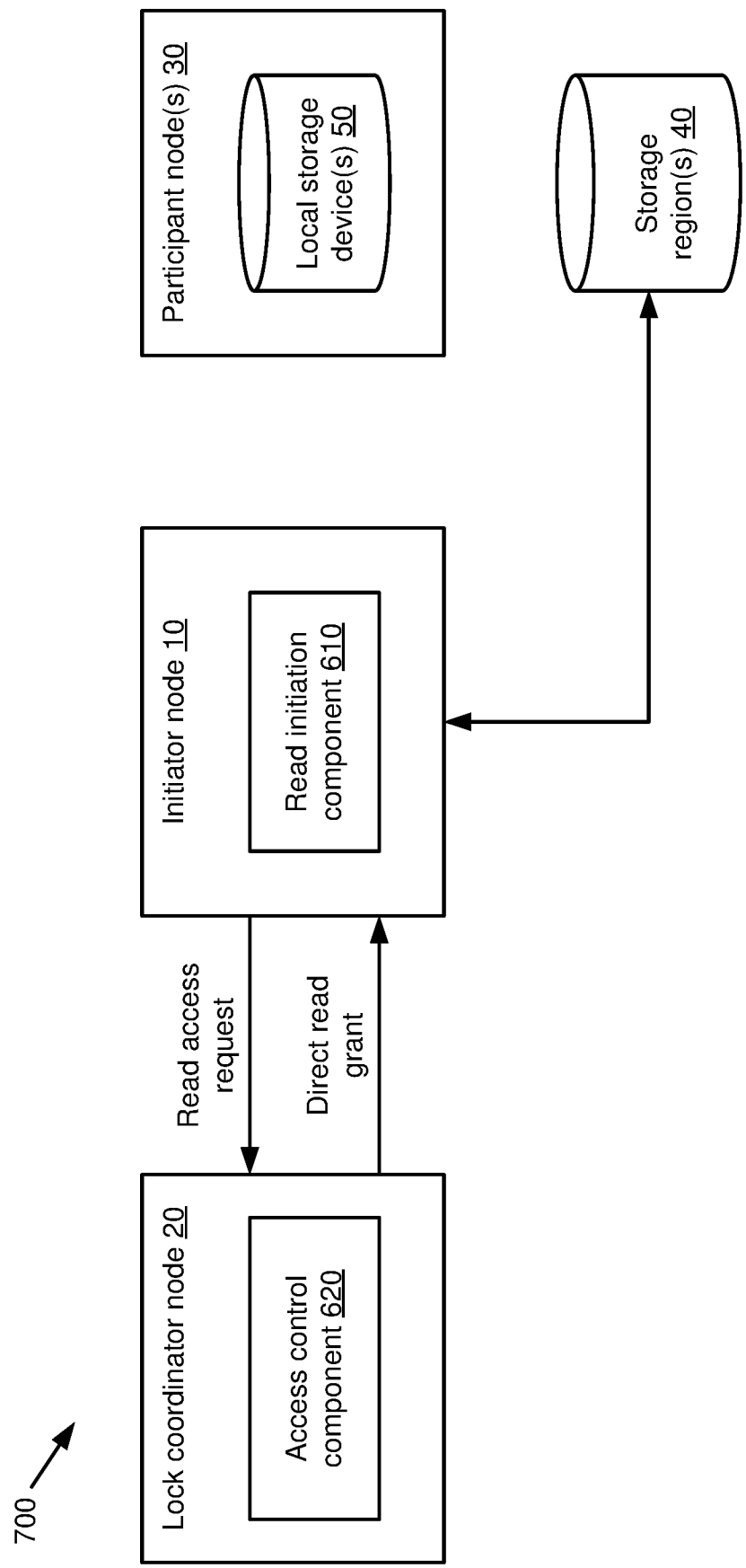

Turning next to FIG. 5, and with additional reference to FIGS. 6-7, a flow diagram of a method 500 for conducting a read operation in a clustered file system in accordance with various implementations described herein is illustrated. A read operation as performed according to method 500 can leverage a reference count for a file and/or an improved write operation as described above to facilitate additional status visibility for files or other resources stored in a clustered file system. This can, in turn, enable files or other resources to be read directly from disk, e.g., via NVMeoF, in some cases. It is noted that while the below description relates to operations performed with respect to disks, other types of storage regions could be utilized in addition to, or in place of, disks without departing from the scope of the description.

Method 500 begins at 502, in which a read initiator (e.g., as implemented via an initiator node 10) obtains a lock to gain read access to a target file or resource from the lock coordinator (e.g., a lock coordinator node 20) that is responsible for that file or resource. In an implementation, depending on the value of a reference count associated with the target file or resource as maintained by the lock coordinator (e.g., via a count maintenance component 410), the lock granted to the read initiator at 502 can be either a direct or indirect read lock. For example, if the reference count for the target file or resource is greater than zero, this can indicate that there are outstanding updates to the file or resource in non-volatile storage associated with at least one participant node 30. As a result, the lock coordinator can grant an indirect read lock at 502 such that the read initiator accesses the target file or resource via the participant(s) with outstanding updates. Alternatively, if the reference count for the file or resource is equal to zero, this can indicate that there are no pending updates to the file or resource, thereby enabling the lock coordinator to grant a direct read lock to the read initiator at 502 to access the file or resource directly without involvement of the responsible participant(s).

At 504, the read initiator can read metadata, layout information, and/or other suitable information that describes the location of the data to be read via the write operation.

At 506, method 500 can branch based on the type of lock that was granted to the read initiator at 502. If an indirect read lock was granted to the read initiator at 502, method 500 can proceed from 506 to 508, in which the read initiator can send a read request to the participant(s) that own the disk(s) that contain the data associated with the target file or resource. Next, at 508, the participant(s) can respond to the read request provided at 506 by returning the corresponding data from either their local non-volatile storage, e.g., if present, or from their respective disk(s) and/or a cache associated with those disk(s).

Example operation of method 500 for an indirect read lock is shown in further detail by system 600 in FIG. 6. As shown in FIG. 6, a read initiation component 610 of an initiator node 10, here a read initiator, can facilitate sending, from the initiator node 10 to a lock coordinator node 20 for a given resource, a request for read access to the resource. If the lock coordinator node 20 determines that there are outstanding writes or other updates associated with the resource, e.g., based on the reference count for the resource being greater than zero, an access control component 620 of the lock coordinator node 20 can provide an indirect read grant to the initiator node 10 that facilitates enabling the initiator node 10 to access the resource via respective participant nodes 30 that manage the respective storage regions 40 on which data corresponding to the resource is stored. The participant nodes 30 can, in turn, provide the initiator node 10 with staged data associated with the resource as stored at local storage devices 50 of the participant nodes 30 that has not yet been written to the storage regions 40, if such data is present at the participant nodes 30. If no staged and unflushed data is present at the participant nodes 30, the participant nodes 30 can instead return data corresponding to the resource as stored on the storage regions 40.

Returning to method 500, if a direct read lock is granted to the read initiator at 502, method 500 can proceed from 506 to 512, in which the read initiator can access the file or resource on disk directly, e.g., without going through the participant node(s) for the corresponding disk(s).

Example operation of method 500 for a direct read lock is shown in further detail by system 700 in FIG. 7. Similar to system 600 in FIG. 6, the read initiation component 610 at the initiator node 10 can facilitate sending a request for read access for a resource to the lock coordinator node 20. In response to the lock coordinator node 20 determining that there are no outstanding updates to the resource, e.g., based on the reference count for the resource being equal to zero, the access control component 620 of the lock coordinator node 20 can provide a direct read grant to the initiator node 10 that facilitates access by the initiator node 10 to the resource as stored on the storage regions 40 directly, e.g., independently of any participant nodes 30 that manage the storage regions 40 associated with the resource.

Returning again to method 500, following completion of the actions at 508-510 for an indirect read grant or the actions at 512 for a direct read grant, method 500 can conclude at 514, in which the read initiator can collate the data corresponding to the resource and return the lock for the resource, e.g., via a notification from the read initiator to the lock coordinator. In an implementation, releasing the lock on the resource at 514 signifies that the read initiator has finished accessing the resource, thereby enabling a lock to be granted to other requesters for further operations on the resource.

Figure 8:
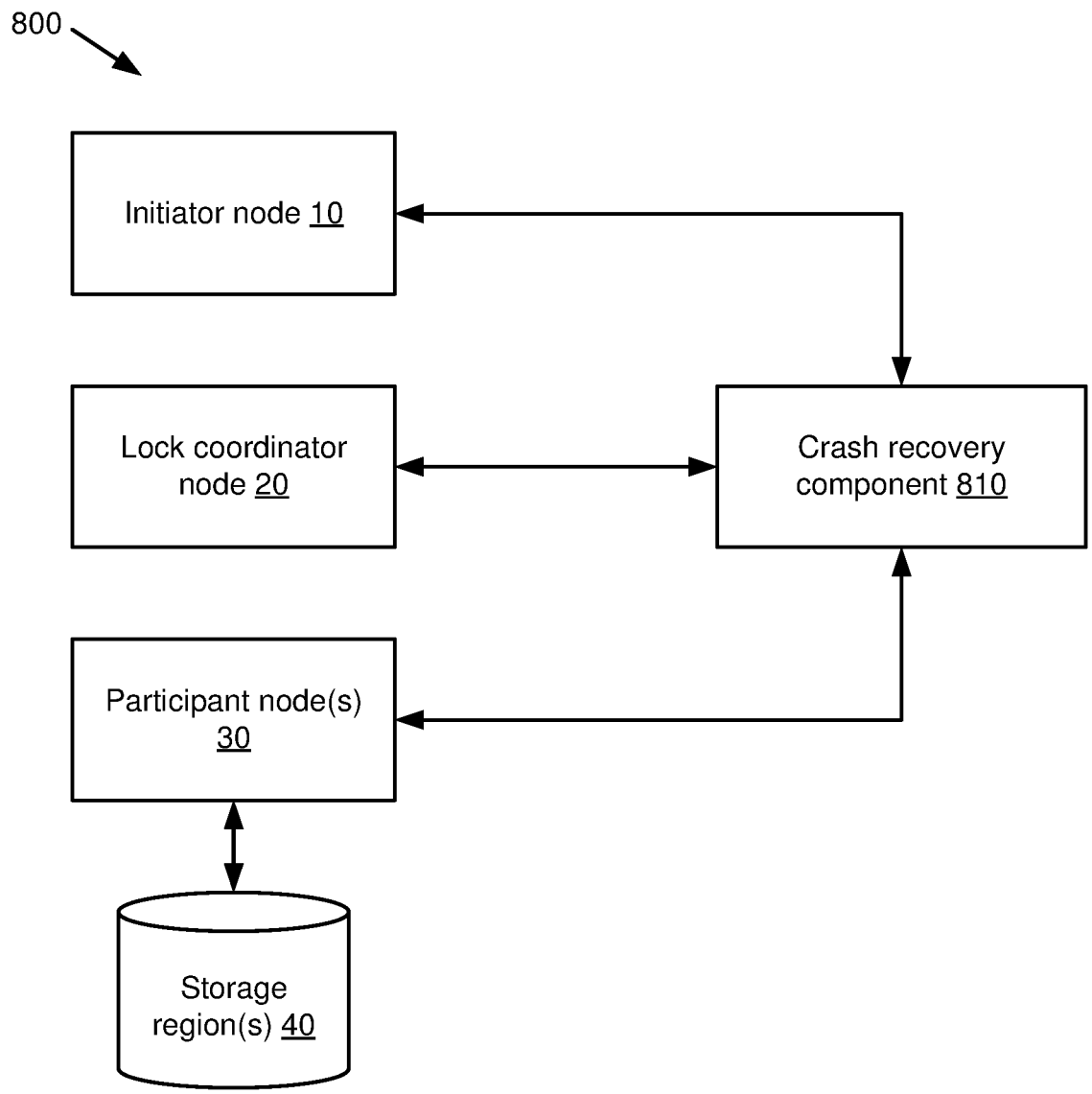
FIG. 8 is a block diagram of a system that facilitates crash recovery in a clustered file system in accordance with various implementations described herein.

Referring now to FIG. 8, a block diagram of a system 800 that facilitates crash recovery in a clustered file system in accordance with various implementations described herein is illustrated. Repetitive description of like elements employed in other embodiments described herein is omitted for brevity. In an implementation, the initiator node 10, lock coordinator node 20, and participant node(s) 30 of system 800 can facilitate a write operation on a file stored by respective storage regions 40 via a transaction conducted according to a 2PC protocol or the like, e.g., as will be described below with respect to FIG. 9. In order to protect this modified write procedure against node failures and/or disconnections at respective stages of the process, system 800 includes a crash recovery component 810 that can facilitate recovery of a file, e.g., by modifying the file to a known stable state, in response to one or more of the nodes 10, 20, 30 becoming unavailable during a write operation. For instance, the crash recovery component 810 can prevent failure or disconnection of a node 10, 20, 30 during a write operation from resulting in leaked references that would result in (permanent) denial of read direct access, lost references that could cause the reading of stale or corrupt data, or other issues.

In an implementation, the crash recovery component 810 can recover reference counts for a given resource via an extended lock re-establishment procedure. Each time the makeup of a cluster changes, e.g., due to nodes being added or removed from the active node set due to the nodes gaining or losing connectivity, respectively, lock re-establishment can cause any lock holder to re-assert all of the locks it currently holds with the (new) lock coordinator. This process can recover, e.g., any lock state information that was on a lock coordinator that was lost after crashing or being disconnected. The crash recovery component 810 can use and augment this process to also recover reference counts for a file or resource as needed or requested.

Figure 9:
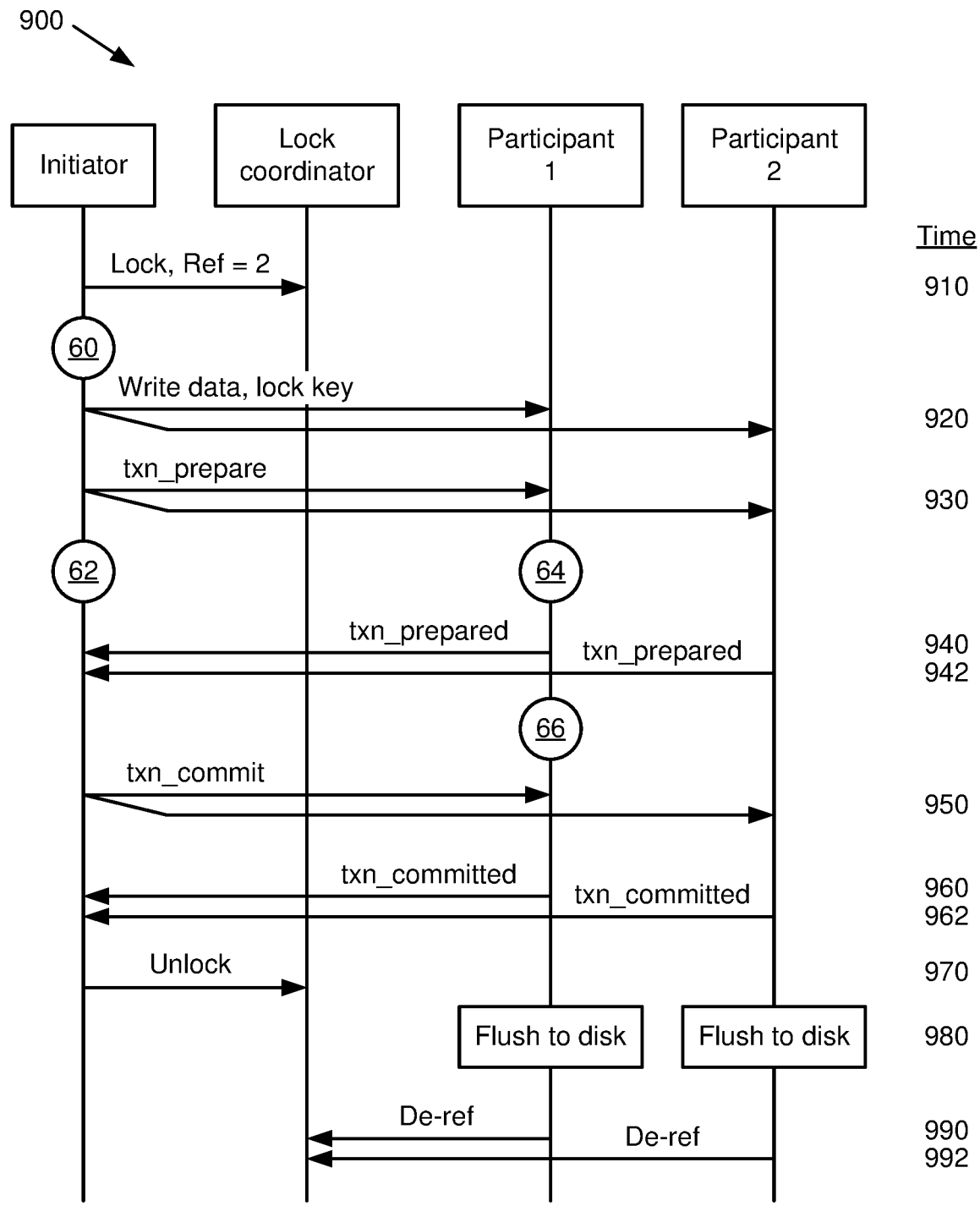
FIG. 9 is a diagram depicting an example messaging flow for a write operation in a clustered file system in accordance with various implementations described herein.

Diagram 900 in FIG. 9 depicts an example messaging flow for a 2PCv2 transaction associated with a file system write and/or a similar operation. The messaging flow illustrated by diagram 900 can be conducted between an initiator (e.g., an initiator node 10) that initiates updates to one or more data or metadata blocks (e.g., one or more blocks corresponding to a file or other resource, etc.), a lock coordinator (e.g., a lock coordinator node 20) that maintains lock states for the blocks to be updated, and respective participants (e.g., participant nodes 30), here two participants, that manage disks or other storage regions 40 associated with the blocks. While one initiator, one lock coordinator, and two participants are shown in diagram 900 for simplicity of illustration, it should be appreciated that similar messaging flows to those illustrated by diagram 900 could also be used for a transaction involving multiple initiators and/or participants. For instance, a similar messaging flow to that shown by diagram 900 could be utilized for a transaction involving one participant, or three or more participants, without departing from the scope of this description. Additionally, respective potential failure points 60, 62, 64, 66 are illustrated at various stages of the messaging flow shown in diagram 900, which will be discussed in further detail following the discussion of the messaging flow.

As shown at time 910, the initiator can send a request a write access lock for a file to the lock coordinator. This request can include information associated with a reference count for the file, e.g., as determined by a reference count component 110 as shown in system 100 and/or as further described with respect to 302 in method 300. Here, the initiator determines that the write operation will result in updates to two parts (e.g., blocks) of the file, and as a result the initiator sets the reference count to 2 and sends this reference count to the lock coordinator. Thus, in the example shown by diagram 900, one reference is present per participant that will be involved in the transaction. It is noted, however, that the reference count can differ from the number of participants to the transaction, e.g., based on the number of blocks to be modified by each participant and/or based on other criteria.

At time 920, the initiator can send write data associated with the transaction, e.g., in the form of write and/or delta messages that collectively include a replica of the blocks to be updated at the respective participants. While not shown in diagram 900, each write or delta message (e.g., write_block, write_delta, write_elide, write_inode, lin_super_write, etc.) sent by the initiator at time 920 could also be sent to additional participants, e.g., secondary or buddy participants, that provide redundancy for the participants shown in diagram 900. In an implementation, the initiator can send the write data to the respective participants in parallel, e.g., as a common message directed toward all participants, and/or in separate messages. As further shown at 920, the messages sent by the initiator to the participants at time 920 can further include a lock key and/or other value corresponding to the file. In an implementation, the lock key can enable the participants to refer to the file in notifications provided to the lock coordinator after completion of the transaction.

Following transfer of the write and/or delta messages at time 920, subsequent resolution of the transaction can proceed per 2PCv2 protocol. For instance, the initiator can send transaction prepare (txn_prepare) messages at time 930 to the respective participants, which can in turn respond with transaction prepared (txn_prepared) messages at times 940 and 942, respectively. In response to receiving the txn_prepared messages, the initiator can then send transaction commit (txn_commit) messages at time 950 to the respective participants, which can in turn respond with transaction committed (txn_committed) messages at times 960 and 962, respectively. At this stage, the write data sent to the respective participants by the initiator at time 920 is staged by the participants at respective local storage devices, e.g., local storage devices 50 as shown in FIGS. 6-7, for transferal to the storage regions managed by the respective participants.

In response to the initiator receiving the txn_committed messages sent by the participants at times 960 and 962, the initiator can begin finalization of the transaction by sending a message to the lock coordinator at time 970 to release the lock on the file, thereby enabling other transactions to be performed on the file. Additionally, while not shown in diagram 900, the initiator can also send return txn_committed messages to the respective participants in order to confirm the transaction.

In further response to the participants committing the transaction and sending the corresponding txn_committed messages as shown at times 960 and 962, the participants can flush any staged write data to disk at 980. Subsequently, the messaging flow as shown by diagram 900 can conclude at times 990 and 992, in which the respective participants can provide notifications to the lock coordinator that include the lock key or other key value provided to the participants at time 920. This, in turn, can enable the lock coordinator to decrement the reference count for the file, e.g., as described above with respect to FIG. 4.

As noted above, the crash recovery component 810 of system 800 can facilitate recovery of file and/or lock states following failure or disconnection of one or more computing nodes involved in a write operation. Various examples of recovery procedures that can be utilized are described in further detail below, e.g., with reference to failure points 60, 62, 64, 66 in FIG. 9. It is noted, however, that other failure conditions could also be handled by the crash recovery component 810 in a similar manner to the recovery procedures described below.

In an implementation, if the lock coordinator crashes or otherwise fails at any point during the process shown in diagram 900, the crash recovery component 810 can facilitate designation of a new lock coordinator. Subsequently, any lock and/or reference count holders can re-assert their lock and/or reference state to the new lock coordinator.

If, as shown at failure point 60 in diagram 900, a write initiator crashes or otherwise becomes unavailable after obtaining a lock and reference count, but before sending reference keys and/or write data to any participants, the initiator will not be part of the lock re-assertion. As a result, the crash recovery component 810 can simply remove the lock and reference counts corresponding to the target file, e.g., by canceling the write operation and setting the reference count for the file to zero. These steps can be taken by the crash recovery component 810, e.g., due to a crash of the write initiator at this point not resulting in any updates to a file.

If, as shown at failure point 62 in diagram 900, a write initiator crashes or otherwise becomes unavailable after sending the reference keys and write data to the participants, but before reaching the commit stage of the transaction, the crash recovery component 810 can cause the participants to re-assert the reference counts they own while not re-asserting the lock itself. Additionally, since the write operation does not proceed to the commit stage, the crash recovery component 810 can cause the participants to abort the transaction. Additionally, the participants can submit notifications to the lock coordinator to decrement the associated reference count(s) in response to aborting the operation, e.g., in a similar manner to that described above with respect to FIG. 4.

Similarly, as shown at failure point 64 in diagram 900, if a participant crashes or otherwise becomes unavailable before the transaction reaches the prepare stage, the crash recovery component 810 can abort the transaction, and any locks and/or reference counts associated with the transaction can be released accordingly. Any nodes to the transaction that are still available can release their locks and reference counts as part of the abort handling, and the node(s) that crash and/or disconnect can be configured to not re-assert their reference counts and also abort the transaction after rejoining the cluster.

If, as shown at failure point 66 in diagram 900, a participant crashes or otherwise becomes unavailable after it has prepared the transactional update (e.g., by staging the write data in local storage prior to flushing the write data to disk), the crashed participant will not be able to re-assert its reference counts, but still holds potentially committing updates in its local storage. Additionally, the drives associated with the crashed participant are not available until the participant itself is accessible again. As a result, when the participant becomes available again, the crash recovery component 810 can prevent direct NVMeoF access to the drive(s) managed by the crashed participant, e.g., access to the affected drives by an initiator node independently of the crashed participant, until the participant has established the outcome of all in-progress transactions and resolved those transactions, e.g., by flushing or aborting the data associated with those transactions. In an implementation, this can be achieved by utilizing a persistent reservation system on the disk, e.g., where the disk is in a separate enclosure, or by not advertising the availability of the affected disk on the participant's NVMeoF controller.

Similar operations to those described with respect to failure point 66 can also be performed by the crash recovery component 810 in the event that a participant crashes or otherwise becomes unavailable after the transaction has committed but before it was able to flush the data to disk.

Accordingly, direct access to the affected disk(s) can be prevented until all transactions are resolved and flushed to disk.

In an implementation in which local non-volatile storage is replicated between multiple participants, e.g., between a primary participant and a secondary or buddy participant, the crash recovery component 810 can enable the secondary participant to take over and re-establish reference counts for a crashed primary participant and allow direct access to the affected disk(s) even before the crashed participant has recovered.

Figure 10:
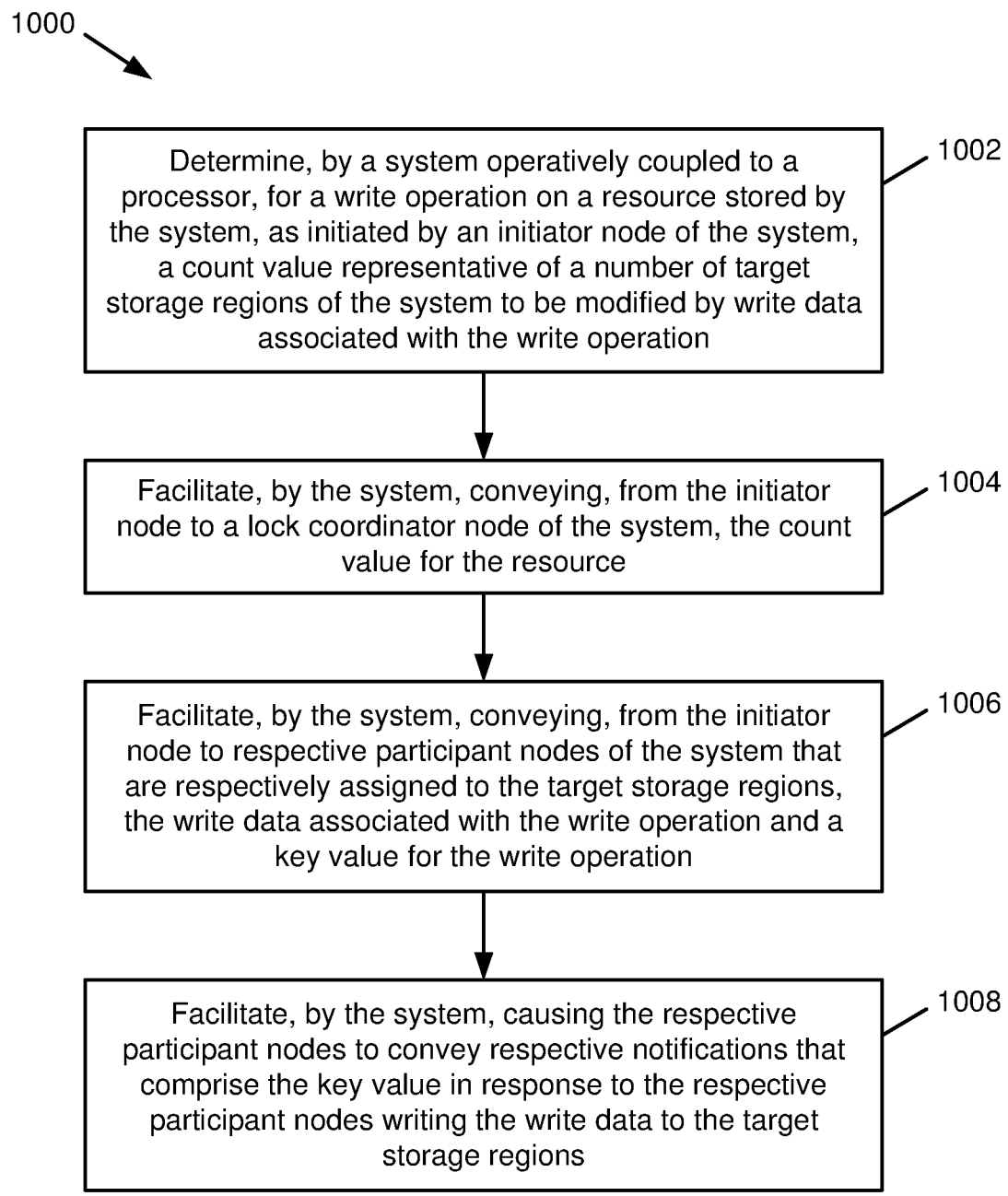
FIG. 10 is a flow diagram of a method that facilitates direct read in clustered file systems in accordance with various implementations described herein.

Referring next to FIG. 10, a flow diagram of a method 1000 that facilitates direct read in clustered file systems in accordance with various implementations described herein is illustrated. At 1002, a system operatively coupled to a processor can determine (e.g., by a reference count component 110), for a write operation on a file or other resource stored by the system (e.g., via a group of disks or other storage regions 40 associated with the system), as initiated by an initiator node (e.g., an initiator node 10 associated with the reference count component 110) of the system, a count value representative of a number of target storage regions of the system to be modified by write data associated with the write operation.

At 1004, the system can facilitate (e.g., by a lock coordinator interface component 120) conveying, from the initiator node to a lock coordinator node (e.g., a lock coordinator node 20) of the system, the count value for the resource as determined at 1002.

At 1006, the system can facilitate (e.g., by a participant interface component 130) conveying, from the initiator node to respective participant nodes (e.g., participant nodes 30) of the system that are respectively assigned to the target storage regions, the write data associated with the write operation and a key value for the write operation.

At 1008, the system can facilitate (e.g., by a participant interface component 130) causing the respective participant nodes to convey respective notifications that comprise the key value provided to the participant nodes at 1006 in response to the respective participant nodes writing the write data to the target storage regions (e.g., as shown at time 980 in diagram 900).

FIGS. 2, 3, 5, and 10 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 11:
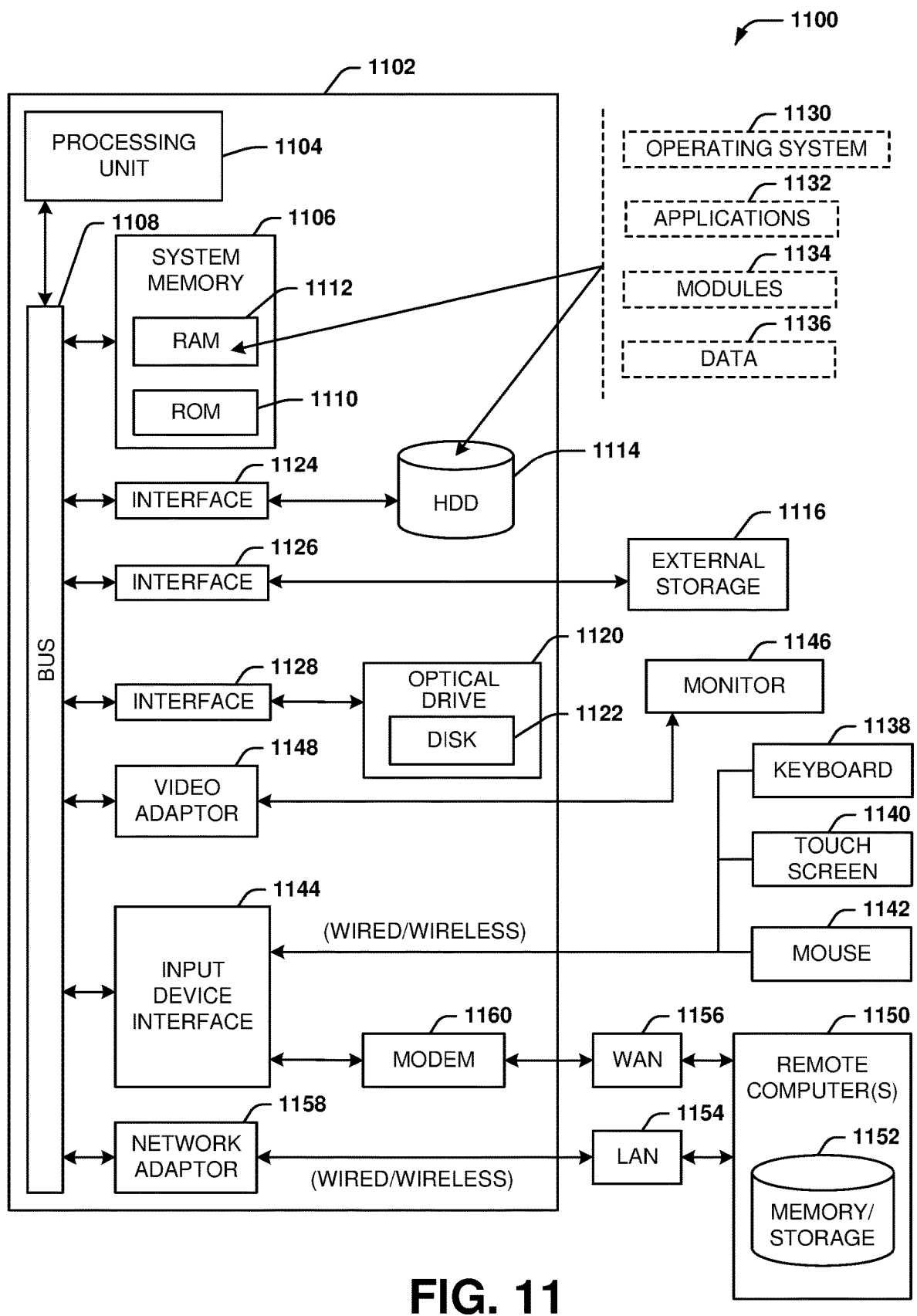
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores executable components; and
   a processor that executes the executable components stored in the memory, wherein the executable components comprise:

a reference count adjustment component that determines, for a write operation on a resource stored by the data storage system, as initiated by an initiator node of the data storage system, a reference count value for the resource comprising a number of affected storage regions associated with the data storage system to be altered with write data associated with the write operation;

a lock coordinator interface component that facilitates sending, from the initiator node of the data storage system to a lock coordinator node of the data storage system, the reference count value for the resource; and a participant interface component that facilitates sending, from the initiator node of the data storage system to respective participant nodes of the data storage system that are respectively assigned to the affected storage regions, the write data associated with the write operation and a lock key corresponding to the write operation, wherein the lock key causes the respective participant nodes to provide, to the lock coordinator node, respective notifications that comprise the lock key in response to the respective participant nodes flushing the write data associated with the write operation to the affected storage regions.

2. The data storage system of claim 1, wherein the executable components further comprise:
a count maintenance component that, in response to the lock coordinator interface component facilitating sending the reference count value for the resource to the lock coordinator node, causes the lock coordinator node to increment a reference count assigned to the resource by the reference count value.

3. The data storage system of claim 2, wherein the count maintenance component, in response to the lock coordinator node receiving a notification of the respective notifications comprising the lock key from a participant node of the participant nodes, causes the lock coordinator node to decrement the reference count assigned to the resource.

4. The data storage system of claim 3, wherein the initiator node is a write initiator node, and wherein the executable components further comprise:
a read initiation component that facilitates sending, from a read initiator node of the data storage system to the lock coordinator node, a request for read access for the resource; and
an access control component that, in response to the read initiation component facilitating the sending of the request for the read access and further in response to the reference count assigned to the resource by the lock coordinator node being determined to be equal to zero, facilitates access to the resource by the read initiator node independently of the respective participant nodes.

5. The data storage system of claim 3, wherein the initiator node is a write initiator node, and wherein the executable components further comprise:
a read initiation component that facilitates sending, from a read initiator node of the data storage system to the lock coordinator node, a request for read access for the resource; and
an access control component that, in response to the read initiation component facilitating the sending of the request for the read access and further in response to the reference count for the resource being determined to be greater than zero, facilitates enabling the read initiator node to access the resource via the respective participant nodes.

6. The data storage system of claim 1, wherein the participant interface component causes the respective participant nodes, in response to receiving the write data from the participant interface component, to stage the write data associated with the write operation at local storage devices associated with the respective participant nodes, resulting in staged write data, and flush the staged write data to the affected storage regions, and wherein the executable components further comprise:
a crash recovery component that facilitates modification of the resource to a known stable state in response to a node, selected from a group comprising the initiator node and the respective participant nodes, becoming unavailable during the write operation.

7. The data storage system of claim 6, wherein the crash recovery component, in response to the initiator node becoming unavailable prior to the participant interface component facilitating the sending of the write data associated with the write operation to the respective participant nodes, cancels the write operation and resets the reference count for the resource to zero.

8. The data storage system of claim 6, wherein the crash recovery component, in response to the node becoming unavailable subsequent to the participant interface component facilitating the sending of the write data associated with the write operation to the respective participant nodes and prior to the write data being staged at the local storage devices associated with the respective participant nodes, aborts the write operation and causes the respective participant nodes to provide the respective notifications to the lock coordinator node in response to the write operation being aborted.

9. The data storage system of claim 6, wherein the crash recovery component, in response to a participant node of the respective participant nodes becoming unavailable subsequent to staging the write data at a local storage device associated with the participant node and prior to the participant node flushing the staged write data to the affected storage regions, prevents access to at least one of the affected storage regions by the initiator node independently of the participant node pending availability of the participant node being restored and the write operation being resolved.

10. The data storage system of claim 1, wherein the affected storage regions correspond to a unit selected from a group comprising a storage disk, a byte, a data block, and a subset of a disk comprising less than all of the storage disk.

11. A method, comprising:
determining, by a system operatively coupled to a processor, for a write operation on a resource stored by the system, as initiated by an initiator node of the system, a count value for the resource, the count value representative of a number of target storage regions of the system to be modified by write data associated with the write operation;
facilitating, by the system, conveying, from the initiator node to a lock coordinator node of the system, the count value for the resource;
facilitating, by the system, conveying, from the initiator node to respective participant nodes of the system that are respectively assigned to the target storage regions, the write data associated with the write operation and a key value for the write operation; and
facilitating, by the system, causing the respective participant nodes to convey respective notifications that comprise the key value in response to the respective participant nodes writing the write data to the target storage regions.

12. The method of claim 11, further comprising:
incrementing, by the system, a reference count assigned to the resource at the lock coordinator node by the count value in response to the count value being conveyed from the initiator node to the lock coordinator node; and
decrementing, by the system, the reference count assigned to the resource at the lock coordinator node in response to the lock coordinator node receiving a notification of the respective notifications comprising the key value.

13. The method of claim 12, wherein the initiator node is a write initiator node, and wherein the method further comprises:
facilitating, by the system, conveying, from a read initiator node of the system to the lock coordinator node, a request for read access for the resource; and
in response to the request for the read access being conveyed and further in response to the reference count for the resource as assigned by the lock coordinator node being determined to be equal to zero, granting, by the system, access to the resource to the read initiator node independently of the respective participant nodes.

14. The method of claim 11, further comprising:
in response to the write data for the write operation being received by the respective participant nodes, instructing, by the system, the respective participant nodes to stage the write data at local storage devices of the respective participant nodes, resulting in staged write data, and to write the staged write data to the target storage regions.

15. The method of claim 14, further comprising:
in response to a node selected from a group comprising the initiator node and the respective participant nodes becoming unavailable subsequent to the respective participant nodes receiving the write data and prior to the write data being staged at the local storage devices of the respective participant nodes, aborting, by the system, the write operation and instructing, by the system, the respective participant nodes to convey the respective notifications to the lock coordinator node.

16. A non-transitory machine-readable medium comprising computer executable instructions that, when executed by a processor of a data storage system, facilitate performance of operations, the operations comprising:
obtaining, for a write operation on a resource stored by the data storage system, as initiated by an initiator node of the data storage system, a count value representative of a number of affected storage units of the data storage system to be modified by write data via the write operation;
transferring the count value from the initiator node to a lock coordinator node of the data storage system;
transferring, from the initiator node to respective participant nodes of the data storage system that respectively manage the affected storage units, the write data and a key value associated with the write operation; and
causing the respective participant nodes to send respective notifications comprising the key value to the lock coordinator node in response to the respective participant nodes recording the write data to the affected storage units.

17. The non-transitory machine-readable medium of claim 16, wherein the operations further comprise:
incrementing a reference count assigned to the resource at the lock coordinator node by the count value; and
decrementing the reference count assigned to the resource at the lock coordinator node in response to the lock coordinator node receiving a notification of the respective notifications comprising the key value.

18. The non-transitory machine-readable medium of claim 17, wherein the initiator node is a write initiator node, and wherein the operations further comprise:
transferring, from a read initiator node of the data storage system to the lock coordinator node, a read access request for the resource; and
in response to the read access request and further in response to the count value assigned to the resource by the lock coordinator node being determined to be equal to zero, granting access to the resource to the read initiator node without intervention from the respective participant nodes.

19. The non-transitory machine-readable medium of claim 16, wherein the operations further comprise:
in response to the write data being received by the respective participant nodes, causing the respective participant nodes to stage the write data at local storage devices of the respective participant nodes, resulting in staged write data, and further causing the respective participant nodes to record the staged write data to the affected storage units.

20. The non-transitory machine-readable medium of claim 19, wherein the operations further comprise:
in response to a participant node of the respective participant nodes becoming unavailable subsequent to staging the write data at a local storage device of the participant node and prior to the participant node recording the staged write data to the affected storage units, preventing access to at least one of the affected storage units by the initiator node without intervention from the participant node pending availability of the participant node being restored and the write operation being resolved.

* * * * *